(12) United States Patent
Kwak et al.

(10) Patent No.: US 7,903,526 B2
(45) Date of Patent: Mar. 8, 2011

(54) RECORDING/REPRODUCING APPARATUS, METHOD OF REPRODUCING DATA, AND SERVO CONTROLLING METHOD

(75) Inventors: Bong Sik Kwak, Seoul (KR); Sang Woo Ha, Seoul (KR); In Ho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 418 days.

(21) Appl. No.: 12/135,754

(22) Filed: Jun. 9, 2008

(65) Prior Publication Data

US 2009/0016189 A1 Jan. 15, 2009

(30) Foreign Application Priority Data

Jun. 8, 2007 (KR) .................. 10-2007-0056109
Jun. 8, 2007 (KR) .................. 10-2007-0056110

(51) Int. Cl.
*G11B 7/00* (2006.01)
(52) U.S. Cl. ...................... 369/103; 369/53.26
(58) Field of Classification Search .......... None
See application file for complete search history.

(56) References Cited

U.S. PATENT DOCUMENTS

| 5,966,361 | A | * | 10/1999 | Stoll | 369/103 |
| 6,088,321 | A | * | 7/2000 | Yamaji et al. | 369/103 |
| 6,418,106 | B1 | * | 7/2002 | Stoll | 369/103 |
| 2005/0185554 | A1 | * | 8/2005 | Osada et al. | 369/53.28 |
| 2006/0280095 | A1 | * | 12/2006 | Tsukagoshi et al. | 369/103 |
| 2009/0016189 | A1 | * | 1/2009 | Kwak et al. | 369/103 |

* cited by examiner

*Primary Examiner* — Peter Vincent Agustin
(74) *Attorney, Agent, or Firm* — Birch, Stewart, Kolasch & Birch, LLP

(57) ABSTRACT

An apparatus for recording/reproducing data using holography technology and a method of reproducing data using the same are disclosed. The recording/reproducing apparatus includes an optical path adjuster which adjusts the path of light emitted from a light source and irradiates the light to a predetermined position of a recording medium, a light reflecting unit which reflects the light transmitting through the recording medium to the predetermined position of the recording medium, an image sensor which receives the reflected light and reproduces data included in the reflected light, and a light receiving unit receiving light, which is not transmitted through the recording medium and is diffracted from the recording medium, and generating a monitoring signal. Accordingly, it is possible to provide a simple optical system suitable for the recording/reproducing apparatus using the holography technology and an efficient method of reproducing data using the same.

11 Claims, 12 Drawing Sheets

(a)

(b)

(c)

(a)

(b)

(c)

(a) 　　(b) 　　(c)

RECORDING/REPRODUCING APPARATUS, METHOD OF REPRODUCING DATA, AND SERVO CONTROLLING METHOD

This application claims the benefit of Korean Patent Application Nos. 10-2007-0056109 and 10-2007-0056110, filed on Jun. 8, 2007, which are hereby incorporated by reference as if fully set forth herein.

BACKGROUND OF THE INVENTION

1. Field of the Invention

The present invention relates to a recording/reproducing apparatus, a method of reproducing data, and a servo controlling method.

2. Discussion of the Related Art

An apparatus for recording/reproducing information on a recording medium such as a compact disc (CD) or a digital versatile disc (DVD), which is widely used, records the information on a single-layer recording surface of the recording medium or reproduces the information recorded on the single-layer recording surface. Storage capacity can be increased by laminating recording/reproducing surfaces of the recording medium, but the number of recording/reproducing surfaces which can be laminated in a single recording medium is four. Thus, there is a limitation in the increase of the storage capacity. Due to the limitation of the storage capacity, recently, storage technology using holography technology has been spotlighted.

The holography technology indicates the technology of reproducing an optical signal in an original form, that is, the technology of storing an interference pattern, which is generated by signal light having information and reference light irradiated at an angle different from that of the signal light, in a recording medium or reproducing information using the diffraction of the stored interference pattern. If the holography technology is used for recording data, since interference patterns can be recorded to overlap each other in a three-dimensional space in a thickness direction of the recording medium, it is possible to remarkably increase the storage capacity. That is, if the information is recorded while changing the incident angle, the phase and the wavelength of the reference light, it is possible to record holography information of several pages in a predetermined recording capacity. That is, it is possible to record holography information of a plurality of pages at any one position of a track of the recording medium.

In a reproducing apparatus for reproducing data recorded using the holography technology, in order to reproduce data of several tens or several hundreds of pages recorded in a predetermined area of the recording medium, a process of rotating the recording medium at a predetermined angle, stopping the recording medium and capturing reproduction light reflected from the recording medium should be repeated several tens times. Therefore, there is a need for a servo method which is applicable to a recording/reproducing apparatus using the holography technology. In the case where the holography technology using a recording/reproducing method different from other recording/reproducing methods is used, there is a need for an optical system or a recording/reproducing method suitable for the holography technology.

SUMMARY OF THE INVENTION

Accordingly, the present invention is directed to a recording/reproducing apparatus, a method of reproducing data, and a servo controlling method that substantially obviate one or more problems due to limitations and disadvantages of the related art.

An object of the present invention is to provide an optical system suitable for a recording/reproducing apparatus using holography technology and an efficient servo method using the same.

Another object of the present invention is to provide an optical system suitable for a recording/reproducing apparatus using holography technology and an efficient recording/reproducing method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording/reproducing apparatus includes: an optical path adjuster which adjusts the path of light emitted from a light source and irradiates the light to a predetermined position of a recording medium; a light reflecting unit which reflects the light transmitting through the recording medium to the predetermined position of the recording medium; an image sensor which receives the reflected light and reproduces data included in the reflected light; and a light receiving unit receiving light, which is not transmitted through the recording medium and is diffracted from the recording medium, and generating a monitoring signal.

The optical path adjuster may include a first adjustment member which adjusts an incident angle of the light emitted from the light source and incident to the recording medium, and a second adjustment member which irradiates the light, of which the incident angle is adjusted, onto the predetermined position of the recording medium. The first adjustment member may include a tiltable mirror surface and adjust the incident angle. The recording/reproducing apparatus may further include an actuator which tilts the mirror surface of the first adjustment member according to the signal generated by the light receiving unit.

The mirror surface of the first adjustment member may be attached to one surface of the actuator. The actuator may tilt the mirror surface of the first adjustment member such that a sum of signals generated by the light receiving unit becomes a maximum. The recording/reproducing apparatus may further include a signal generator which generates the monitoring signal using the sum of the signals generated by the light receiving unit, and a controller which controls the actuator according to the monitoring signal. The controller may output a signal for controlling the driving of the actuator such that the monitoring signal becomes the maximum and output a signal for controlling the image sensor such that an image is captured at a position where the actuator is driven The second adjustment member may include a plurality of lenses and irradiates the incident light to the predetermined position of the recording medium, regardless of the incident angle of the light, of which the incident angle is adjusted, incident to the second adjustment member. The light reflecting unit may include a reflection member including a reflection surface for reflecting the light transmitting through the recording medium and a reflected-light adjustment member for reflecting the light reflected from the reflection member to the predetermined position of the recording medium.

The recording/reproducing apparatus may further include an interface receiving and transmitting an external recording/reproducing command to the controller.

In another aspect of the present invention, a recording/reproducing apparatus includes: an optical path adjuster which adjusts the path of light emitted from a light source and irradiates the light onto a predetermined position of a recording medium; a light reflecting unit which reflects the light transmitting through the recording medium to the predetermined position of the recording medium and generates an optical signal for reproducing data; a light receiving unit which receives the light irradiated onto the recording medium and diffracted from the recording medium and generates a signal corresponding to the amount of the received light; and a controller which outputs a control signal to a servo driving unit according to the signal generated by the light receiving unit.

The recording/reproducing apparatus may further include a signal generator which generates a control signal and a recording/reproducing signal using the signal generated by the light receiving unit and outputs the generated control signal or recording/reproducing signal to the controller. The recording/reproducing apparatus may further include a focus servo driving unit which controls a position where the light is irradiated onto the recording medium, according to a focus error signal generated by the signal generator. The recording/reproducing apparatus may further include an astigmatism lens on an optical path directed to the light receiving unit. The focus error signal may be a difference between sums of diagonal signals generated by the light receiving unit. The light receiving unit may include a plurality of light receiving elements which are arranged in a n*n matrix and generate the signal corresponding to the amount of light, and the focus error signal may be a difference between sums of signals generated by the light receiving elements arranged in a diagonal direction, in the plurality of light receiving units.

The recording/reproducing apparatus may further include a tracking servo driving unit which controls the light to trace a track of the recording medium, according to a tracking error signal generated by the signal generator. The tracking error signal may be a difference between a sum of left signals and a sum of right signals on the basis of a track direction of the recording medium. The light receiving unit may include a plurality of light receiving elements which are arranged in a n*n matrix and generate the signal corresponding to the amount of light, and the tracking error signal may be a difference between a sum of signals generated by the light receiving elements provided on the left side of a predetermined line and a sum of signals generated by the light receiving elements provided on the right side of the predetermined line, in the plurality of light receiving units.

The recording/reproducing apparatus may further include a spindle servo driving unit which controls a rotation velocity of the recording medium rotating along a track, according to a rotation error signal generated by the signal generator. The rotation error signal may be a difference between a sum of left signals and a sum of right signals on the basis of a radius direction of the recording medium. The light receiving unit may include a plurality of light receiving elements which are arranged in a n*n matrix and generate the signal corresponding to the amount of light, and the rotation error signal may be a difference between a sum of signals generated by the light receiving elements provided on the left side of a predetermined line and a sum of signals generated by the light receiving elements provided on the right side of the predetermined line, in the plurality of light receiving units.

In another aspect of the present invention, a method of reproducing data includes: irradiating reference light onto a recording medium on which multiplexed data is recorded; receiving the reference light diffracted from the recording medium and generating a monitoring signal; controlling an optical path adjuster according to the generated monitoring signal and adjusting an incident angle of the reference light incident to the recording medium; and reproducing data included in interference light using the interference light which is formed by reflecting the light transmitting through the recording medium and transmitting the light through the recording medium again.

The adjusting of the incident angle may include driving the optical path adjuster such that the monitoring signal becomes a maximum and adjusting the incident angle of the reference light. The adjusting of the incident angle may be performed at the time of reproducing data of a first page or at the time of reproducing data of each page of the multiplexed data of the recording medium. The adjusting of the incident angle may include driving an actuator which tilts a mirror surface included in the optical path adjuster and adjusting the incident angle of the reference light.

The monitoring signal may be proportional to the amount of diffracted light received by the light receiving unit. The incident angle of the reference light may be adjusted so as to correspond to the incident angle of the light at the time of recording the data.

In another aspect of the present invention, a method of reproducing data includes: irradiating reference light onto a recording medium on which multiplexed data is recorded; receiving the reference light diffracted from the recording medium and generating a control signal; and reflecting the light transmitting through the recording medium and reproducing the data while the generated control signal is controlled not to be deviated from a reference range. The incident angle of the reference light may be adjusted so as to correspond to the incident angle of the light at the time of recording the data.

In another aspect of the present invention, a method of reproducing data includes: irradiating reference light onto a recording medium on which multiplexed data is recorded; receiving the reference light diffracted from the recording medium and generating a control signal; and controlling the generated control signal not to be deviated from a reference range.

The control signal may include a focus error signal and a focus servo driving unit may be controlled such that the focus error signal is not deviated from a predetermined reference range. The focus error signal may be a difference between sums of diagonal signals generated by a light receiving unit. The control signal may include a tracking error signal and a tracking servo driving unit ma be controlled such that the tracking error signal is not deviated from a predetermined reference range. The tracking error signal may be a difference between a sum of left signals and a sum of right signals of the light receiving unit on the basis of a track direction of the recording medium. The control signal may include a rotation error signal and a spindle servo driving unit may be controlled such that the rotation error signal is not deviated from a predetermined reference range. The rotation error signal may be a difference between a sum of left signals and a sum of right signals of the light receiving unit on the basis of a radius direction of the recording medium.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments of the present invention will be described with reference to the accompanying drawings. In the present specification, a "recording medium" includes all media on which data is recorded or will be recorded, such as an optical disc. A "recording/reproducing apparatus" includes a recording apparatus which can only record data, a reproducing apparatus which can only reproduce data, and an apparatus which can record and reproduce data.

Figure 1:
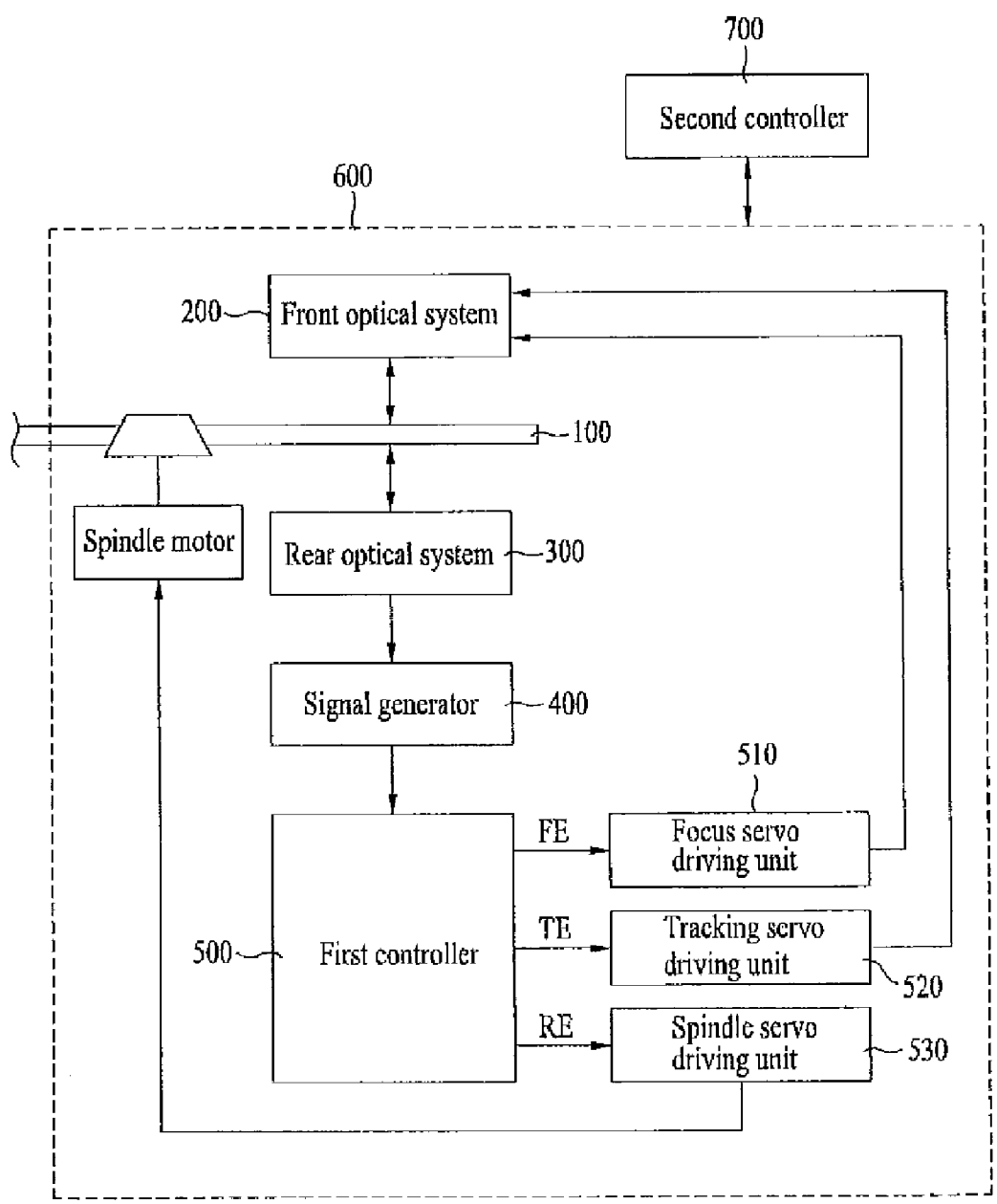
FIG. 1 is a block diagram showing the configuration of a recording/reproducing apparatus according to an embodiment of the present invention.

FIG. 1 is a block diagram showing the configuration of a recording/reproducing apparatus according to an embodiment of the present invention together with a recording medium. The recording/reproducing apparatus of the present invention largely includes an optical system, a signal generator, a controller and a servo driving unit. In the present specification, the optical system includes a front optical system and a rear optical system, both of which are mounted with the recording medium interposed therebetween. The front optical system and the rear optical system are used for convenience of description and are not limited thereto.

Figure 2:
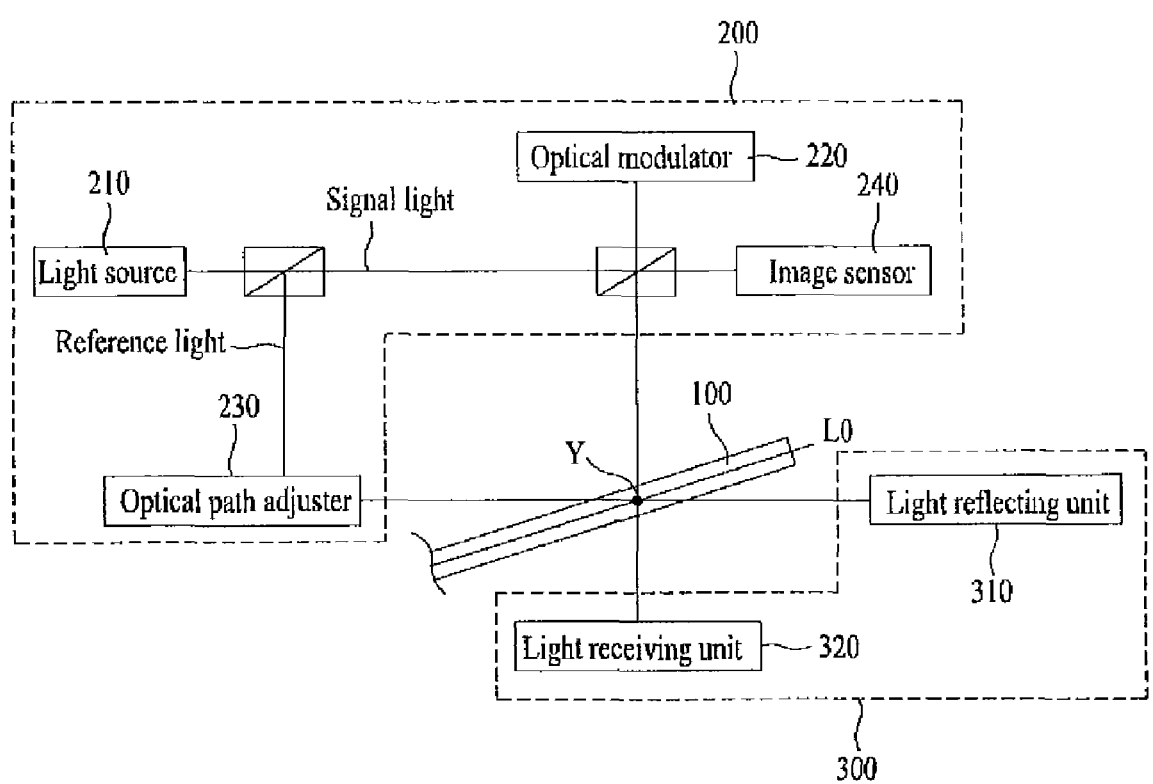
FIG. 2 is a block diagram showing an optical system included in the recording/reproducing apparatus according to the embodiment of the present invention, together with a recording medium.
Figure 3A:
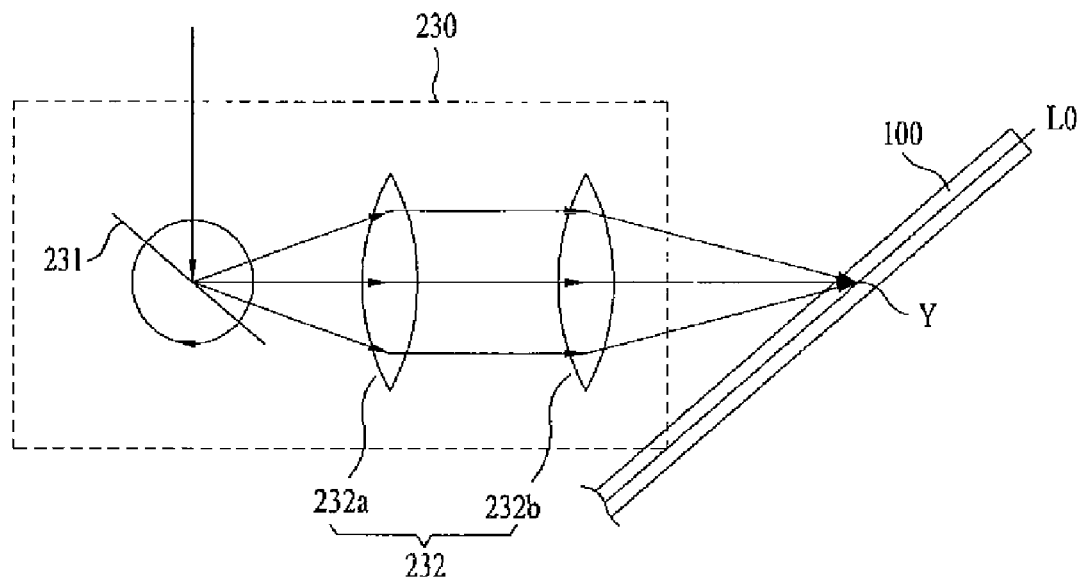
FIGS. 3A and 3B are schematic views showing an optical path adjuster included in the optical system according to the embodiment of the present invention, together with the recording medium.
Figure 3B:
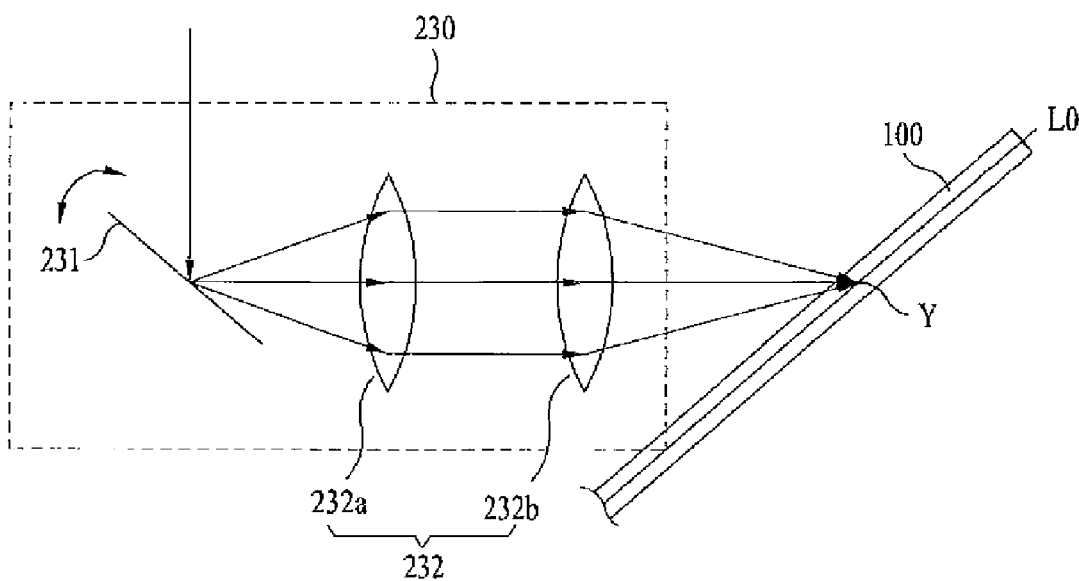

FIG. 2 is a block diagram showing an embodiment of the optical system included in the recording/reproducing apparatus according to the present invention. As shown, the front optical system 200 includes a light source 210, an optical path adjuster 230, an optical modulator 220, an image sensor 240 and other optical elements. The rear optical system 300 includes a light receiving unit 320 and a light reflecting unit 310. These components will now be described in detail with reference to the drawings.

The light source 210 generates high interference light, for example, light such as a laser beam and includes a gas laser, a solid laser, a semiconductor laser or a semiconductor diode. A collimation lens 210 for collecting the light output from the light source 210 may be provided at the output terminal of the light source 210.

The light output from the light source 210 transmits through at least one optical element such as a beam splitter for path change and division. In the present embodiment, the light transmits through one beam splitter. The beam splitter may include at least one transparent substrate and at least one grating layer for diffracting the light or a mirror which partially reflects the light and passes the remaining parts other than the reflected light part. By the beam splitter, the incident light is divided into signal light and reference light. For example, the incident light is partially transmitted and the remaining parts other than the reflected light part are reflected according to a polarization direction.

The optical modulator 220 includes a signal pattern (data pattern) in the signal light when data is recorded. For example, the optical modulator 220 may include binary data represented by a black-and-white dot pattern in the signal light irradiated onto the recording medium 100.

The optical path adjuster 230 adjusts the incident angle, the direction, the wavelength and the phase of the incident reference light and irradiates the reference light onto the recording medium 100. In more detail, the optical path adjuster 230 multiplexes the angle of the reference light in order to record or reproduce the data on/from the recording medium 100 using holography technology. The multiplexing indicates that the data is recorded or reproduced while continuously changing the incident angle of the reference light irradiated onto a predetermined area of the recording medium 100. If this method is used, several hundreds or several thousands of holograms configured in the page units of binary data can be stored in the same place. That is, a large amount of data is recorded or reproduced on/from the recording medium 100 in the page units such that the data can be recorded or reproduced with high storage density.

FIGS. 3A, 3B, 4A and 4B are schematic views showing the configuration of a detailed embodiment of the optical path adjuster 230. As shown, the optical path adjuster 230 includes a first adjustment member 231 including a reflection surface, which reflects the reference light and can rotate, move or tilt in order to adjust the incident angle or the direction of the reference light, and a second adjustment member 232 for irradiating the light, of which the incident angle is adjusted, onto a predetermined position of the recording medium. A reflection surface driving unit for rotating, moving and tilting the reflection surface according to a control signal of a first controller may be further included.

In more detail, in the present embodiment, the first adjustment member 231 includes a rotatable reflection surface. In addition, as the reflection surface of the first adjustment member 231 rotates, the incident angle of the light incident to the second adjustment member is changed.

Figure 13:
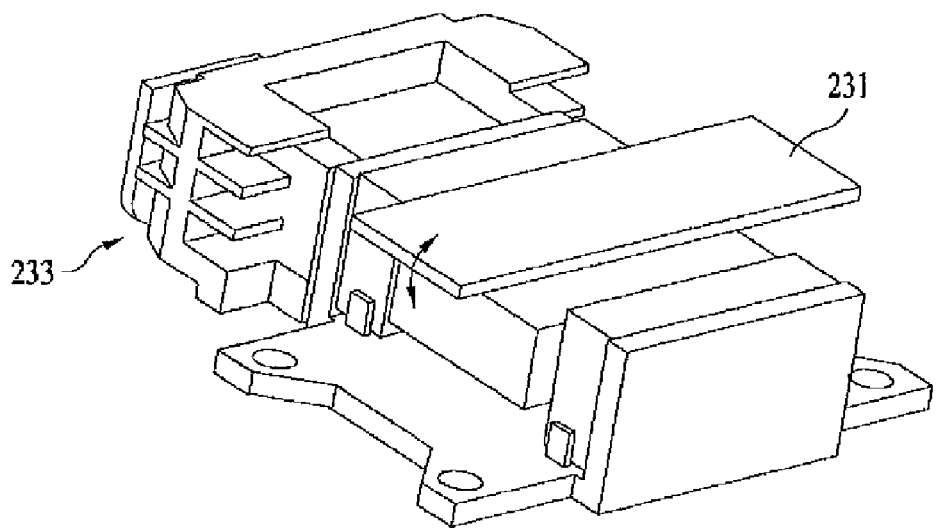
FIG. 13 is a schematic perspective view showing an actuator for driving the first adjustment member according to the present invention, together with the first adjustment member.

At this time, the first adjustment member 231 may be attached to one surface of an actuator 233 for driving the first adjustment member 231, which is shown in FIG. 13. In the present embodiment, the actuator 233 is driven according to a monitoring signal such that the first adjustment member 231 is tilted by a simple method. Such a configuration simplifies the optical system.

Figure 4A:
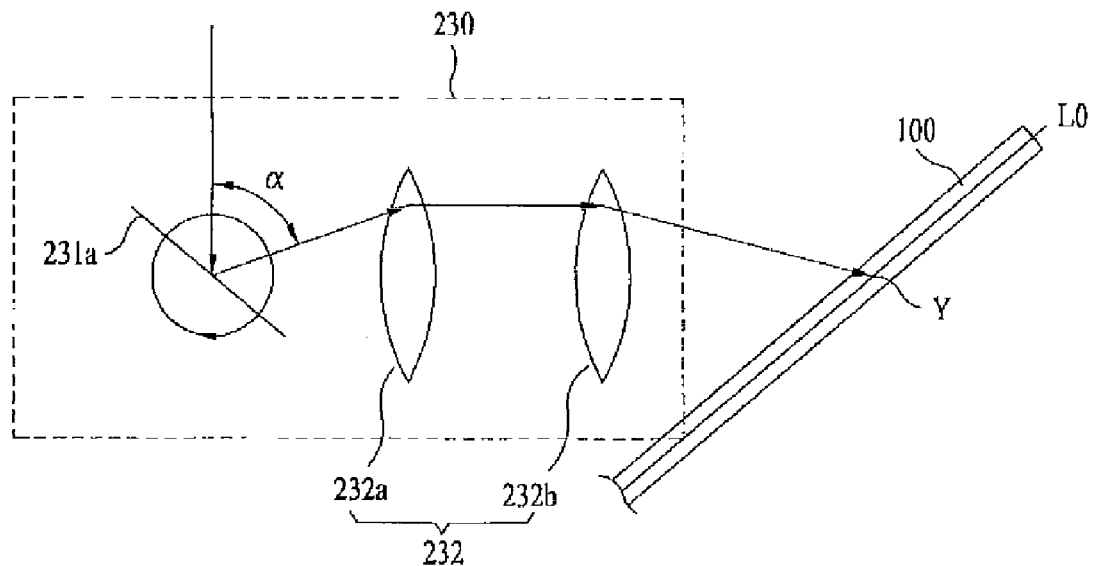
FIGS. 4A and 4B are schematic views showing a change in optical path by a first adjustment member in the optical path adjuster included in the optical system of FIG. 3.
Figure 4B:
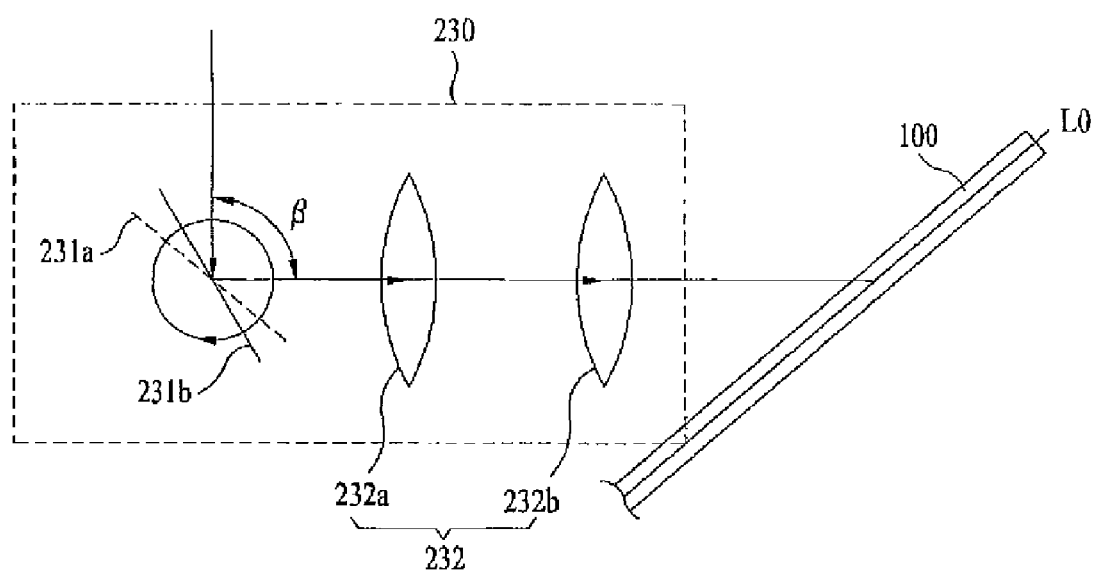

The second adjustment member 232 uniformly irradiates the light, of which the incident angle is adjusted, onto a specific portion of the recording medium, independent of the incident angle. As shown in FIGS. 4A and 4B, even when the incident angle of the light incident to the second adjustment member 232 is changed by the rotation of the first adjustment member 231, the light transmitting through the second adjustment member 232 is irradiated onto the same position Y of a recording layer L0 included in the recording medium. Accordingly, the light can be irradiated onto the recording medium while only the incident angle of the light incident to the same position Y is changed. Here, as shown, the second adjustment member 232 may include two lenses including a first lens 232a and a second lens 232b or each of the first lens 232a and the second lens 232b may include two lenses. That is, the second adjustment member may include four lenses.

Figure 5:
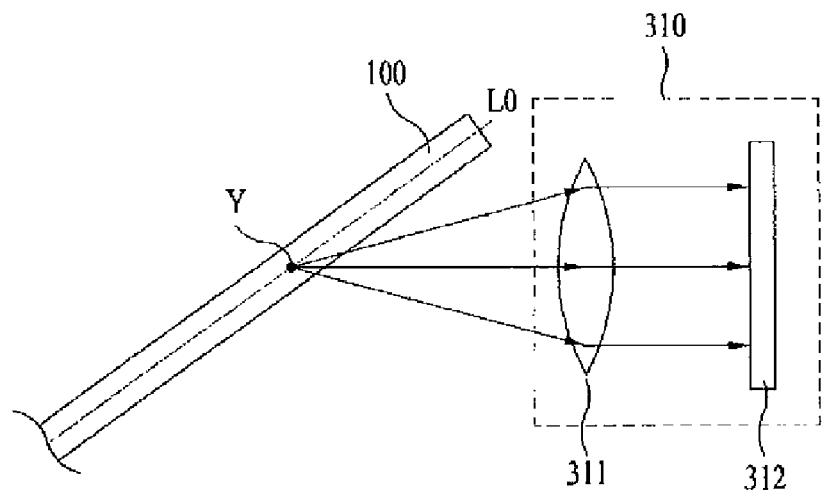
FIG. 5 is a schematic view showing a light reflecting unit included in the optical system according to the embodiment of the present invention, together with the recording medium.

The light reflecting unit 310 of FIG. 2 reflects the light transmitting through the recording medium. In more detail, a detailed embodiment of the light reflecting unit 310 will be described with reference to FIG. 5. In the present embodiment, the light reflecting unit 310 includes a reflected-light adjustment member 311 and a reflection member 312. The reflection member 312 includes a reflection surface for reflecting the light transmitting through the recording medium and reflects the light. The reflected-light adjustment member 311 parallelizes the light incident to the reflection member 312. The reflected-light adjustment member 311 reflects the light reflected from the reflection member 312 to the same path as the path of the transmitted light. The reflected-light adjustment member 311 may include a plurality of lenses.

The image sensor 240 captures a data image using the light reflected from the light reflecting unit 310. For example, the image sensor 240 is configured to capture the data image when the amount of reflected light becomes a maximum. The image sensor 240 includes a semiconductor image sensor such as a charge coupled device (CCD). Here, a beam splitter configured to make the reflected light incident to the image sensor may be further included.

Figure 7:
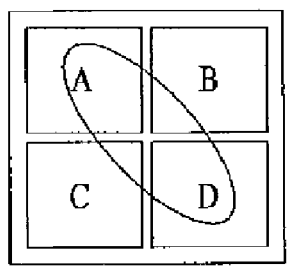
FIG. 7 is a view showing the form of the received light according to a change in position of the recording medium onto which the light is focused.
Figure 7:
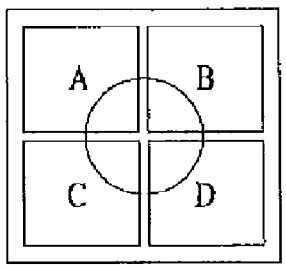
Figure 7:
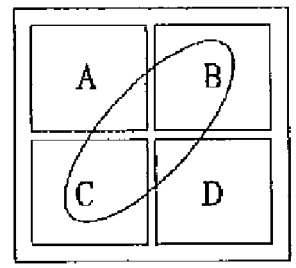

The light receiving unit 320 receives the light diffracted from the recording medium 100 when the light is made incident to the recording medium 100 via the optical path adjuster 230. That is, the light diffracted from the recording medium 100 is received independent of the light reflected from the light receiving unit 310 and received by the image sensor 240. Here, the light receiving unit 320 includes a light receiving element for generating a signal corresponding to the amount of received light. In the present specification, for convenience of description, as shown in FIG. 7, for example, the case where the light receiving unit includes four light receiving elements A, B, C and D will be described.

Figure 6:
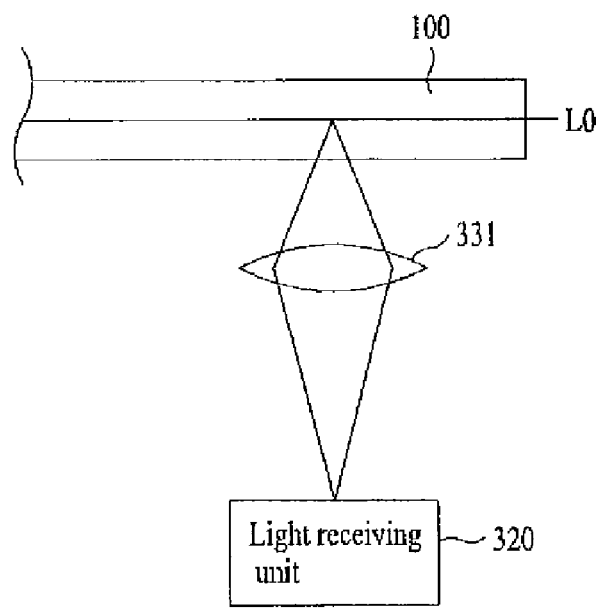
FIG. 6 is a block diagram showing a light receiving unit of the embodiment of the present invention, together with the recording medium.

As shown in FIG. 6, the recording/reproducing apparatus of the present invention further includes an astigmatism lens 331 on a path directed to the light receiving unit 320 for receiving the light. A focus error (FE) signal can be generated using a signal generated by the light receiving unit 320, which will be described in detail later.

The signal generator 400 of FIG. 1 generates signals for servo control and monitoring, such as a recording/reproducing signal (RF signal), a FE signal, a tracking error (TE) signal and a rotation error (RE) signal, using the signal output from the light receiving unit 320, which will now be described in detail by referring to the signal detected by the light receiving unit 320. As described above, for example, the case where the light receiving unit includes four light receiving elements A, B, C and D will be described and the generation of the signals will be sequentially described. In one embodiment of the present invention, a monitoring signal may use the recording/reproducing signal (RF signal) which is proportional to the amount of light received by the light receiving unit 320. Here, the recording/reproducing signal (RF signal) is proportional to the amount of light received by the light receiving unit 320 and can be calculated as follows.

$$RF = a+b+c+d \quad \text{Equation 1}$$

where, a, b, c and d denote the respective photoelectric converted signals output from the light receiving elements A, B, C and D.

FIG. 7 is a view showing the light received by the light receiving unit via the astigmatism lens 331 in order to generate the FE signal. As shown, if the light is focused on the recording layer L0 of the recording medium via the astigmatism lens 331, the circular light is received as shown in FIG. 7B. If the light is focused on the upper side or the lower side of the recording layer L0 deviated from the recording layer L0, the light having the shape of FIG. 7A or 7C is received. When the photoelectric converted signals generated by the light receiving elements A, B, C and D are a, b, c and d, the FE signal can be calculated as follows. In this case, when the light is focused on the recording layer such that the circular light signal is obtained, the FE signal becomes zero (FE=0). Therefore, when the detected FE signal is 0 or is in an allowable reference range centered on 0, the control of the focusing position using the FE signal can be performed.

$$FE = (a+d) - (b+c) \quad \text{Equation 2}$$

Hereinafter, for convenience of description, the case where the FE signal becomes 0 and the light is accurately focused on the recording layer will be described.

Figure 8:
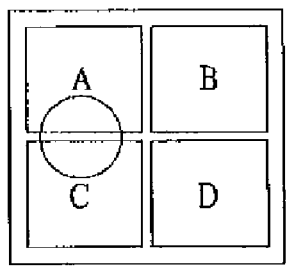
FIG. 8 is a view showing the form of the light received by the light receiving unit according to a change in position of a track of the recording medium onto which the light is irradiated, according to an embodiment of the present invention.
Figure 8:
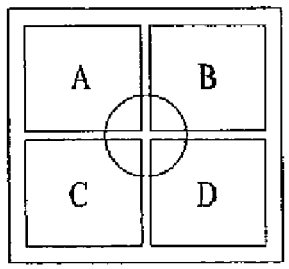
Figure 8:
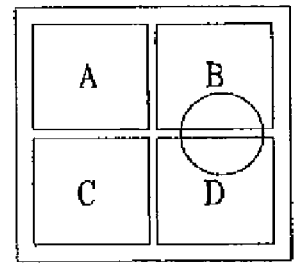
Figure 9:
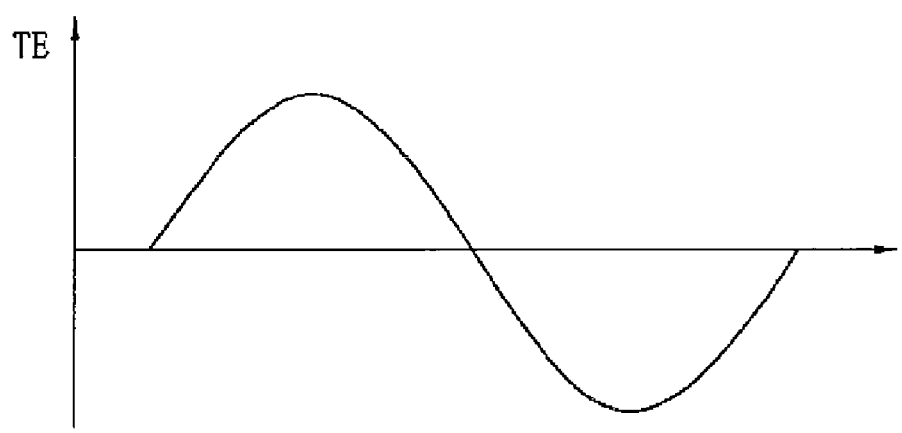
FIG. 9 is a view showing a change in a tracking error signal according to an embodiment of the present invention.

FIGS. 8 and 9 show the TE signal. If the light irradiated onto the recording medium is deviated from a track and is shifted to the left and right sides of the track, as shown in FIG. 8, the light of the light receiving unit is shifted to the left and right sides in a track direction. Therefore, the TE signal is calculated by a difference between a sum of left signals and a sum of right signals of the light receiving unit on the basis of the track direction as expressed by Equation 3. The TE signal is represented by a graph of FIG. 9. When the TE signal is 0, the light is located at the central portion of the track.

$$FE=(a+c)-(b+d) \qquad \text{Equation 3}$$

Figure 10:
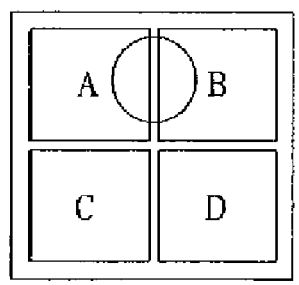
FIG. 10 is a view showing the form of the light received by the light receiving unit according to a change in position of a track of the recording medium onto which the light is irradiated, according to another embodiment of the present invention.
Figure 10:
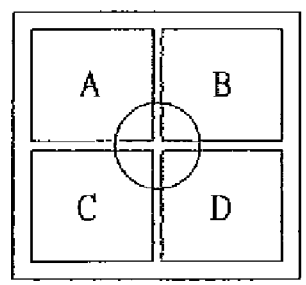
Figure 10:
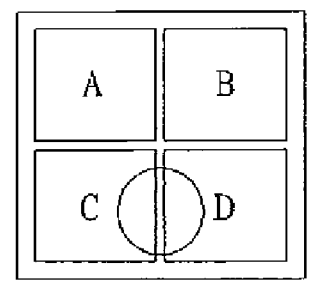
Figure 11:
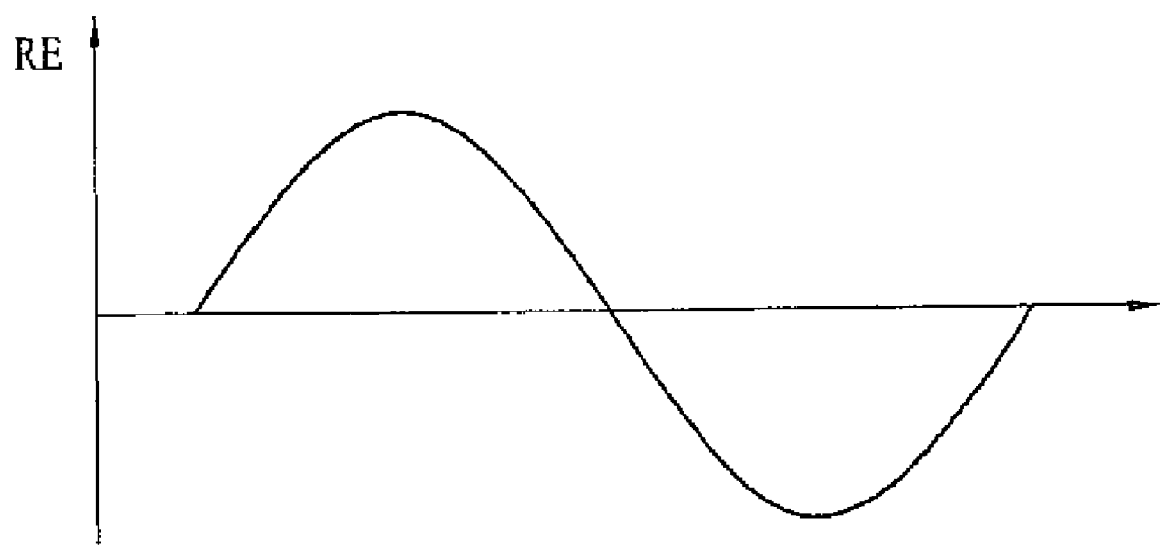
FIG. 11 is a view showing a change in rotation error signal according to an embodiment of the present invention.

FIGS. 10 and 11 show the RE signal. If the light irradiated onto the recording medium is deviated from a position of a book for recording/reproduction and is located at the front and back sides in a rotation direction, as shown in FIG. 10, the light of the light receiving unit is shifted to the left and right sides in the rotation direction. Therefore, the RE signal is calculated by a difference between a sum of left signals and a sum of right signals of the light receiving unit on the basis of the radius direction of the recording medium as expressed by Equation 4. The TE signal is represented by a graph of FIG. 11. When the light is accurately located at the position of the book for recording/reproduction, the RE signal becomes 0

$$RE=(a+b)-(c+d) \qquad \text{Equation 4}$$

Figure 12:
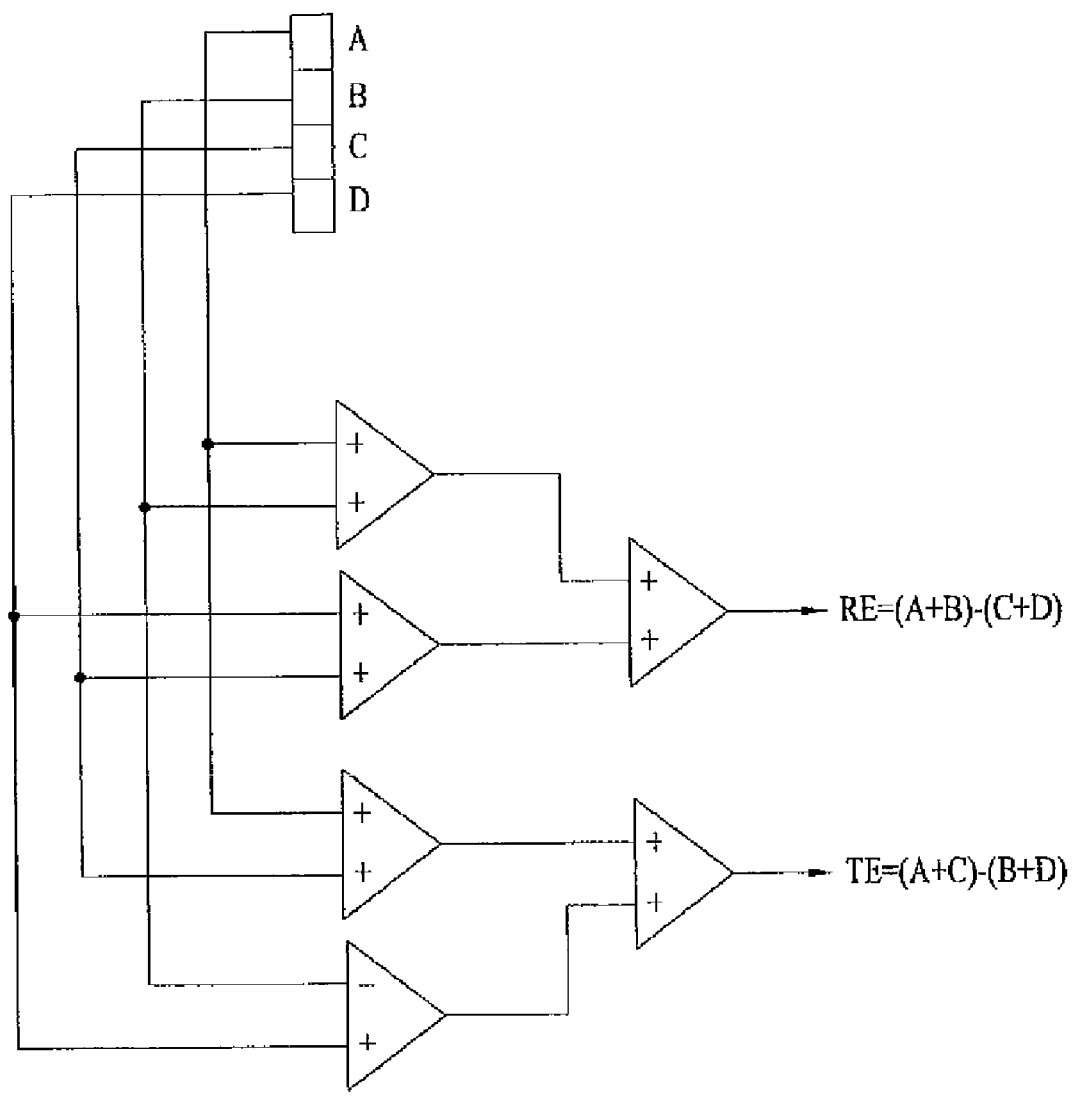
FIG. 12 is a block diagram showing a process of calculating a tracking error signal and a rotation error signal according to the present invention.

FIG. 12 is a block diagram showing a process of calculating the TE signal and the RE signal.

The first controller 500 of FIG. 1 outputs a control signal for controlling a servo driving unit using the signal generated by the signal generator 400. That is, the first controller 500 outputs the control signals to the focus servo driving unit 510, the tracking servo driving unit 520 and the spindle servo driving unit 530 according to the FE signal, the TE signal and the RE signal. A control signal for controlling the optical path adjuster 230 of the front optical system 200 is also output from the first controller 500. The first controller 500 outputs the control signal for controlling the optical path adjuster 230 of the front optical system 200 to the actuator 233 of the optical path adjuster according to the monitoring signal generated by the signal generator 400.

The tracking servo driving unit 520 and the focus servo driving unit 510 drive the optical path adjuster 230 of the front optical system 200 or the recording medium 100 such that the position where the light is irradiated onto the recording medium 100 is changed. The spindle servo driving unit 530 drives the spindle motor so as to change the rotation velocity of the recording medium 100.

A second controller 700 for receiving and transmitting an external recording/reproducing command to a recording/reproducing unit 600 via an interface may be further included. An example of the interface may include an advanced technology attached packet interface (ATAPI) 110. The ATAPI 110 is the interface standard between the recording/reproducing unit such as a CD or DVD drive and the host, that is, the standard which is suggested for transmitting decoded data from a drive to a host and converts the decoded data into a packet type protocol, which is data processed by the host, and transmits the protocol.

Figure 14:
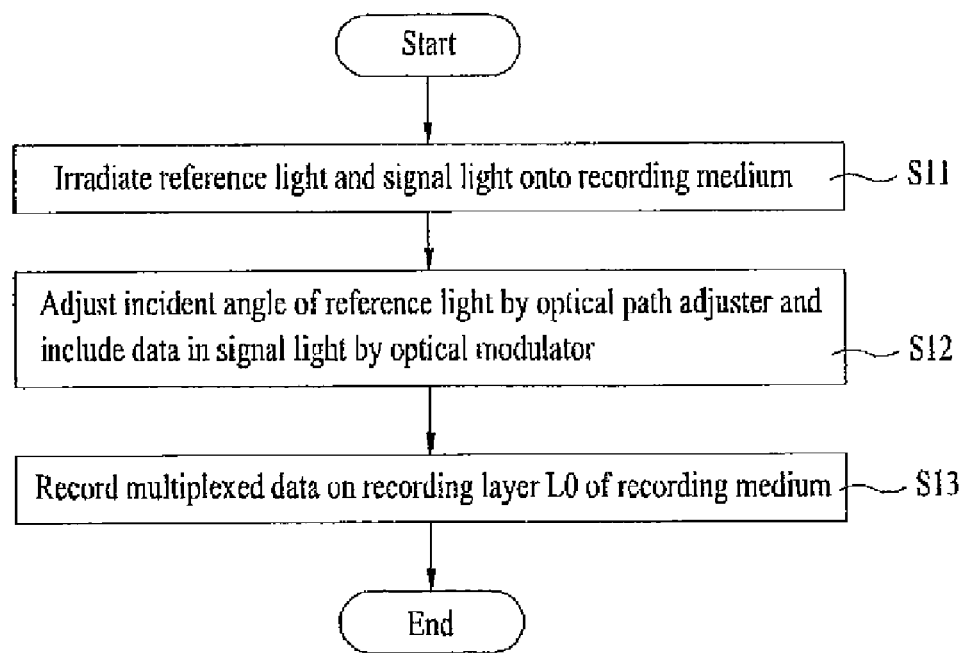
FIG. 14 is a flowchart showing a method of recording data according to the present invention.

Hereinafter, a recording method and a reproducing method using the recording/reproducing apparatus of the present invention will be described in detail. First, the method of recording data on the recording medium 100 will be described in detail with reference to FIG. 14. The light emitted from the light source 210 is divided into the signal light and the reference light, and the signal light and the reference light are irradiated onto the recording medium 100 (S11). The signal light includes the data signal. The optical modulator 220 includes binary data in the signal light by various methods. The reference light is irradiated onto the recording medium 100 while the incident angle thereof is changed by the optical path adjuster 230 (S12). The data image of several pages can be recorded in an area of the recording medium 100 so as to overlap each other while the incident angle thereof is changed (S13). At this time, the optical path adjuster 230 may be controlled such that the incident angle is changed by the first controller 500.

In order to reproduce the data from the recording medium 100 in which the overlapped image is recorded, only the reference light should be irradiated onto the recording medium 100. In addition, in order to accurately reproduce the data, the incident angle of the reference light should be equal to the incident angle at the time of recording the data. The reproduction indicates an operation for reading the stored data and includes the execution of a stored computer program and the output and copy of stored data.

If the data stored in the recording medium 100 is reproduced, first, the first controller 500 positions the optical path adjuster 230 to a position where the data can be reproduced. That is, the first controller 500 moves the optical path adjuster 230 to the position where the reference light can be irradiated in an area of the recording medium, on the basis of a page address of the stored data. In particular, it is preferable that the first adjustment member 231 and the second adjustment member 232 of the optical path adjuster 230 are positioned at a position where data of a first page or a last page can be read, among the data of several pages (data images) stored in the area of the recording medium 100. A method of finding the position where the data of the first page or the last page can be read is various. For example, before reproducing the data of the first page or the last page, an align mark captured via the image sensor 240 can be used. The align mark is generated at the time of recording the data and is displayed in the circumference of the data image or a specific area. The first controller 500 may determine whether or not the angle of the first adjustment member 231 of the optical path adjuster 230 is accurate on the basis of the align mark and whether or not the image sensor 240 is aligned to a corresponding data page.

Figure 15:
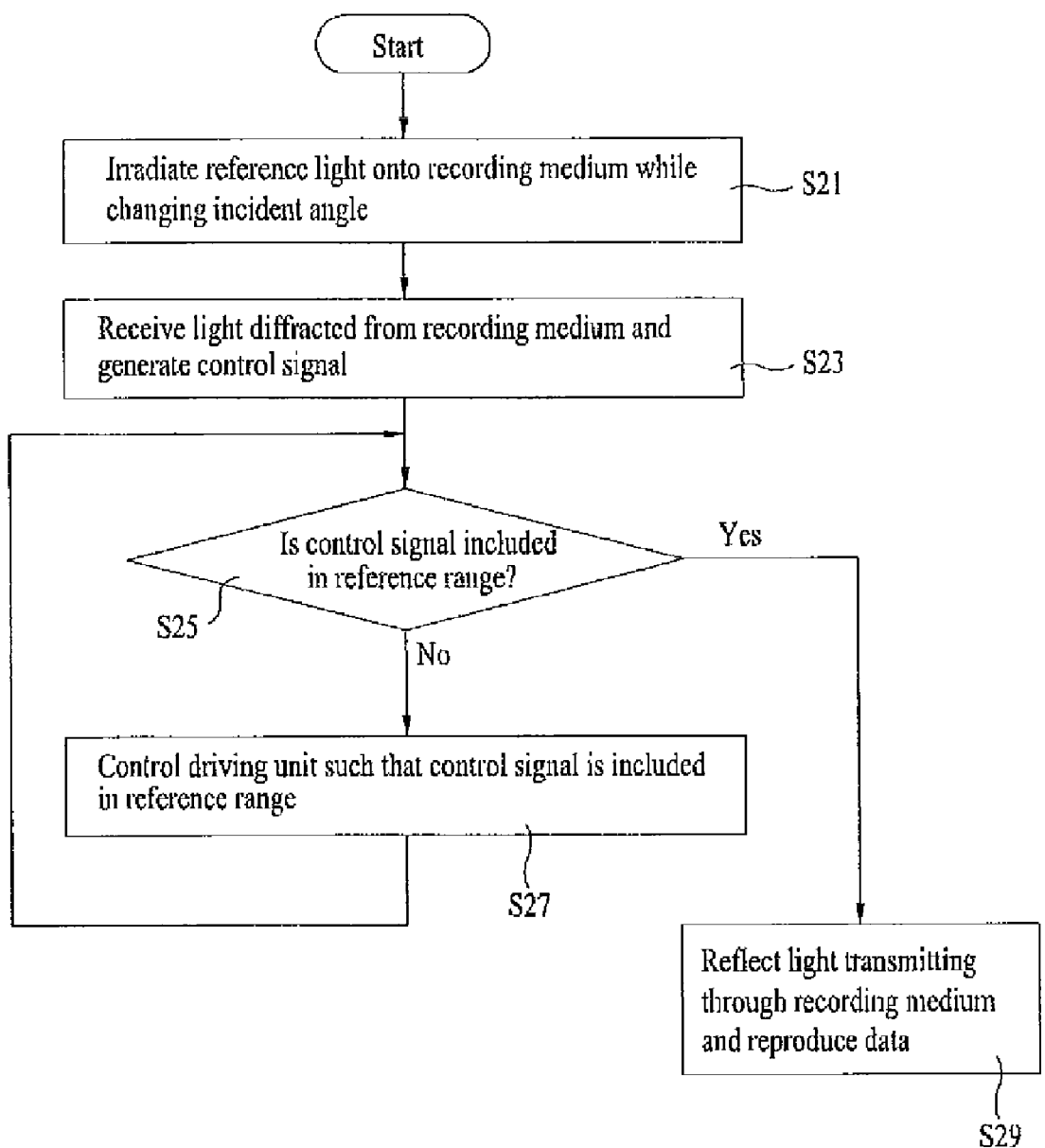
FIG. 15 is a flowchart showing a method of reproducing data according to a first embodiment of the present invention.

A method of reproducing data at the above position according to a first embodiment of the present invention will be described in detail with reference to FIG. 15. The light output from the light source 210 is divided into the signal light and the reference light. Since the signal light is not required at the time of reproducing the data, the light transmitted to the optical modulator 220 is not irradiated onto the recording medium 100.

When the reference light starts to be irradiated onto the recording medium 100 via the optical path adjuster 230, the first adjustment member 231 of the optical path adjuster 230 may continuously or intermittently change the incident angle of the reference light from a minimum incident angle to a maximum incident angle or from the maximum incident angle to the minimum incident angle according to the command of the first controller 500. That is, the reference light is irradiated onto the recording medium 100 while changing the incident angle of the light incident to the recording medium 100 (S21). The minimum incident angle is the incident angle of the reference light for reading the data of the first page and the maximum incident angle is the incident angle of the reference light for reading the data of the last page.

A portion of the reference light incident to the recording medium 110 is diffracted and is received by the light receiving unit 320. The signal generator 400 generates the control signal using the signal output from the light receiving unit 320 and outputs the control signal to the first controller 500 (S23). The first controller 500 outputs the control signal to the servo driving unit according to the received control signal. That is, the FE signal, the TE signal and the RE signal are controlled to become 0 or to be in the reference range centered on 0. That is, it is determined whether or not the control signal is included in the reference range (S25), the driving unit is controlled such that the control signal is included in the reference range if it is determined that the control signal is not included in the reference range (S27), and the light transmitting through the recording medium is reflected and the data is reproduced if it is determined that the control signal is included in the reference range (S29).

Figure 16:
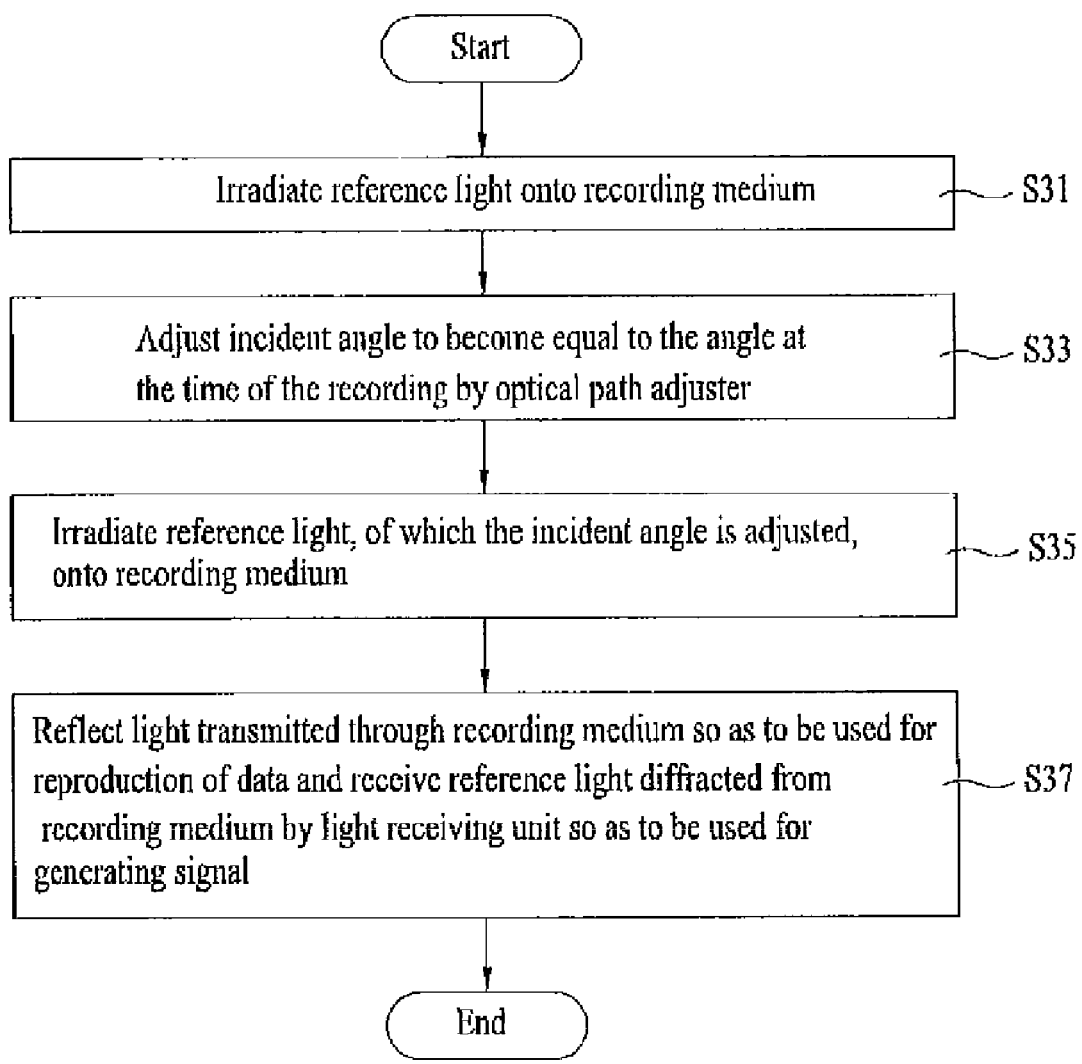
FIG. 16 is a flowchart showing a method of reproducing data according to a second embodiment of the present invention.

A method of reproducing the data at the above position according to a second embodiment of the present invention will be described in detail with reference to FIG. 16. The light output from the light source 210 is divided into the signal light and the reference light. Since the signal light is not required at the time of reproducing the data, the light transmitted to the optical modulator 220 is not irradiated onto the recording medium 100. Therefore, the reference light is irradiated onto the recording medium 100, for the reproduction of the data (S31). If necessary, the signal light may be used at the time of the reproduction of the data.

When the reference light starts to be irradiated onto the recording medium 100 via the optical path adjuster 230, the first adjustment member 231 of the optical path adjuster 230 may continuously or intermittently change the incident angle of the reference light from a minimum incident angle to a maximum incident angle or from the maximum incident angle to the minimum incident angle according to the command of the first controller 500. The minimum incident angle is the incident angle of the reference light for reading the data of the first page and the maximum incident angle is the incident angle of the reference light for reading the data of the last page. The incident angle is controlled to be equal to the incident angle at the time of the recording of the data (S33). For example, the reference light is irradiated onto the recording medium 100 while changing the incident angle of the light incident to the recording medium 100. In more detail, the actuator 233 is driven according to the monitoring signal such that the first adjustment member 231 is tilted. At this time, the first adjustment member 231 is tilted such that the generated recording/reproducing signal (RF signal) for monitoring has a maximum value. The actuator 233 is driven such that the reflection surface of the first adjustment member 231 is positioned at the position where the detected recording/reproducing signal (RF signal) has a largest value because the diffraction efficiency is high in every page of the recorded data and a first page of a book in the recoding medium 100 in which multiplexed data is recorded. Accordingly, a separate element such as an image sensor is not required and the incident angle for the reproduction of the data can be controlled. The book indicates the area of the recording medium 100 in which the information is recorded to overlap each other by a multiplexing method.

The reference light, of which the incident angle is adjusted, is irradiated onto the recording medium 100 such that the incident angle becomes equal to the incident angle at the time of the recording of the data (S35). A portion of the reference light is transmitted through the recording medium 100, is reflected from the light reflecting unit 310 and is made incident to the recording medium 100 again. The reflected light is transmitted through the recording medium 100 so as to form interference light such that the recorded data is included in the interference light. The interference light is received by the image sensor 240 such that the data is reproduced. Since the image is captured at the position where the recording/reproducing signal (RF signal) has a largest value so as to reproduce the data, the recorded data can be reproduced without error. A portion of the reference light incident to the recording medium 110 is diffracted and is received by the light receiving unit 320 and the recording/reproducing signal (RF signal) for monitoring, which drives the actuator 233, is formed and is used for feedback control (S37).

In the recording/reproducing apparatus and the recording/reproducing method according to the present invention have the following effects.

That is, it is possible to provide a simple optical system suitable for a recording/reproducing apparatus using holography technology.

In addition, it is possible to provide an efficient servo method in a recording/reproducing process using the holography technology and a recording/reproducing method.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A recording/reproducing apparatus comprising:
an optical path adjuster which adjusts the path of light emitted from a light source and irradiates the light to a predetermined position of a recording medium;
a light reflecting unit which reflects the light transmitting through the recording medium to the predetermined position of the recording medium;
an image sensor which receives the reflected light and reproduces data included in the reflected light; and
a light receiving unit receiving light, which is not transmitted through the recording medium and is diffracted from the recording medium, and generating a monitoring signal.

2. The recording/reproducing apparatus according to claim 1, wherein the optical path adjuster includes a first adjustment member which adjusts an incident angle of the light emitted from the light source and incident to the recording medium, and a second adjustment member which irradiates the light, of which the incident angle is adjusted, onto the predetermined position of the recording medium.

3. The recording/reproducing apparatus according to claim 2, wherein the first adjustment member includes a tiltable mirror surface and adjusts the incident angle.

4. The recording/reproducing apparatus according to claim 3, further comprising an actuator which tilts the mirror surface of the first adjustment member according to the signal generated by the light receiving unit.

5. The recording/reproducing apparatus according to claim 4, wherein the mirror surface of the first adjustment member is attached to one surface of the actuator.

6. The recording/reproducing apparatus according to claim 4, wherein the actuator tilts the mirror surface of the first adjustment member such that a sum of signals generated by the light receiving unit becomes a maximum.

7. The recording/reproducing apparatus according to claim 6, further comprising:
a signal generator which generates the monitoring signal using the sum of the signals generated by the light receiving unit; and
a controller which controls the actuator according to the monitoring signal.

8. The recording/reproducing apparatus according to claim 7, wherein the controller outputs a signal for controlling the driving of the actuator such that the monitoring signal becomes the maximum and outputs a signal for controlling the image sensor such that an image is captured at a position where the actuator is driven.

9. The recording/reproducing apparatus according to claim 2, wherein the second adjustment member includes a plurality of lenses and irradiates the incident light to the predetermined position of the recording medium, regardless of the incident angle of the light, of which the incident angle is adjusted, incident to the second adjustment member.

10. The recording/reproducing apparatus according to claim 1, wherein the light reflecting unit includes a reflection member including a reflection surface for reflecting the light transmitting through the recording medium and a reflected-light adjustment member for reflecting the light reflected from the reflection member to the predetermined position of the recording medium.

11. The recording/reproducing apparatus according to claim 1, further comprising an interface receiving and transmitting an external recording/reproducing command to the controller.

* * * * *